United States Patent
Smith (10) Patent No.: US 9,448,951 B2
(45) Date of Patent: Sep. 20, 2016

(54) PROCESSOR COMMUNICATIONS (71) Applicant: STMicroelectronics (R&D) Ltd., Buckinghamshire (GB)

(72) Inventor: David Smith, Bristol (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 47 days.

(21) Appl. No.: 13/705,435

(22) Filed: Dec. 5, 2012

(65) Prior Publication Data
US 2013/0151792 A1 Jun. 13, 2013

(30) Foreign Application Priority Data

Dec. 12, 2011 (GB) .................................. 1121272.7

(51) Int. Cl.
G06F 13/12 (2006.01)
G06F 13/10 (2006.01)
G06F 3/06 (2006.01)
G06F 13/16 (2006.01)
G06F 15/167 (2006.01)
G06F 1/10 (2006.01)
G06F 5/06 (2006.01)
G06F 13/42 (2006.01)

(52) U.S. Cl.
CPC .............. *G06F 13/102* (2013.01); *G06F 1/10* (2013.01); *G06F 3/0614* (2013.01); *G06F 13/16* (2013.01); *G06F 15/167* (2013.01); *G06F 3/061* (2013.01); *G06F 5/06* (2013.01); *G06F 13/423* (2013.01)

(58) Field of Classification Search
None
See application file for complete search history.

(56) References Cited

U.S. PATENT DOCUMENTS 4,549,273 A 10/1985 Tin
6,131,114 A 10/2000 Guezou et al.
(Continued)

FOREIGN PATENT DOCUMENTS

EP 0113379 A1 7/1984
JP 61355351 A 6/1988
(Continued)

OTHER PUBLICATIONS

Great Britain Search Report dated Mar. 28, 2012 from corresponding Great Britain Application No. 1121272.7.

*Primary Examiner* — Henry Tsai
*Assistant Examiner* — Aurangzeb Hassan
(74) *Attorney, Agent, or Firm* — Allen, Dyer, Doppelt, Milbrath & Gilchrist, P.A.

(57) ABSTRACT

A processor module including a processor configured to share data with at least one further processor module processor; and a memory mapped peripheral configured to communicate with at least one further processor memory mapped peripheral to control the sharing of the data, wherein the memory mapped peripheral includes a sender part including a data request generator configured to output a data request indicator to the further processor module dependent on a data request register write signal from the processor; and an acknowledgement waiting signal generator configured to output an acknowledgement waiting signal to the processor dependent on a data acknowledgement signal from the further processor module, wherein the data request generator data request indicator is further dependent on the data acknowledgement signal and the acknowledgement waiting signal generator acknowledgement waiting signal is further dependent on the acknowledgement waiting register write signal.

20 Claims, 6 Drawing Sheets

(56) References Cited

U.S. PATENT DOCUMENTS

| | | | |
|---|---|---|---|
| 6,493,803 B1* | 12/2002 | Pham et al. | 711/147 |
| 6,622,225 B1* | 9/2003 | Kessler | G06F 13/1642 711/105 |
| 6,694,385 B1* | 2/2004 | Fuoco et al. | 710/8 |
| 6,701,405 B1* | 3/2004 | Adusumilli et al. | 710/308 |
| 7,624,209 B1* | 11/2009 | Ansari et al. | 710/58 |
| 2003/0018879 A1* | 1/2003 | Sahraoui et al. | 712/1 |
| 2003/0050990 A1* | 3/2003 | Craddock et al. | 709/212 |
| 2004/0117565 A1* | 6/2004 | Brant et al. | 711/154 |
| 2008/0320243 A1 | 12/2008 | Mitsuzuka et al. | |
| 2009/0271536 A1* | 10/2009 | Tiennot | 710/28 |
| 2011/0191507 A1* | 8/2011 | Bond et al. | 710/23 |
| 2013/0132682 A1* | 5/2013 | Kassoff | 711/143 |

FOREIGN PATENT DOCUMENTS

| | | |
|---|---|---|
| JP | 63155351 A | 6/1988 |
| JP | 01239664 A | 9/1989 |

* cited by examiner

PROCESSOR COMMUNICATIONS

CROSS REFERENCE TO RELATED APPLICATIONS

This application claims the priority benefit of Great Britain patent application number 1121272.7, filed on Dec. 12, 2011, which is hereby incorporated by reference to the maximum extent allowable by law.

BACKGROUND

1. Technical Field

The present application relates to processor communications and in particular but not exclusively for processor communication for controlling shared memory data flow. One embodiment is for controlling multiprocessor data transfers accessing a shared memory on a single integrated circuit package, but can be used in any shared memory controller.

2. Discussion of the Related Art

Microprocessor-based systems are increasingly containing multiple central processor units (CPU) or cores which are required to communicate with each other. A method for implementing this communication between CPU cores is to use an area of shared memory.

However using shared memory requires the control of the flow of data through the shared memory area. For example the shared memory area is required to be controlled such that the receiving processor does not attempt to read data before the sender has placed it in the memory, a read after write (RAW) hazard, where the receiving processor accesses the old data. Furthermore the shared memory should be controlled such that the sending processor does not attempt to overwrite data in the shared memory before the receiver has read the data on the memory, a write after read (WAR) hazard where the receiver cannot access the old data.

These hazards have been researched and proposed solutions have involved implementing flow control in shared memory as a circular buffer where the sender send a write pointer (WP), indicating the next memory location to be sent data by the sender, to the receiver and the receiver sends a read pointer (RP), indicating the next memory location to the read from by receiver, to the sender.

In such examples the sender places data in the buffer, updates its local write pointer, and sends the new pointer value to the receiver.

The receiver receives the updated write pointer, compares it to its read pointer and the comparison enables the receiver to determine whether it can read data from the current read pointer address (in other words the receiver when detecting the difference between the read pointer and write pointer is greater than a threshold enables a read operation to occur).

The receiver when a read operation on the shared memory is performed can then send an updated read pointer back to the sender.

The sender, on receiving the updated read pointer, has the information that the receiver has read the data from the buffer, and thus can 'clear' the memory space, enabling the sender to write data again providing the sender write operation does not result in the write pointer catching up with or passing the read pointer.

However such communication of pointers between the processors may require pointers which are large enough to address the whole of the buffer. For example a buffer with 256 locations requires a minimum of eight bits per pointer. Furthermore the flow control can implement pointers as relative addresses (relative to the base of the buffer), or absolute addresses. Thus the read and write pointers can require typically 32 bit addressing capability (or even larger numbers of bits per pointer).

Furthermore such communication is problematic where the sender and receiver are on separate chips (or on the same chip) separated by significant routing distance. In such examples the overhead of communicating multiple wires between the sender and receiver could be unacceptably high.

Although there has been suggestion that further shared memory locations can be used to store the read and write pointer values, and thus not require the transfer of write and read pointers between the central processing units, the use of additional shared memory space places different communication loads on both the sender and receiver to poll the pointer locations for updated pointer values.

Furthermore where the sender and receiver are in separate clock domains the communication of read and write pointers require additional hardware to ensure the pointers are communicated safely without corruption due to clock domain boundary errors.

Further flow control designs determine a common transfer size between sender and receiver, enable the sender to maintain local read and write pointers, and enable the receiver to maintain a local read pointer. Such examples further are configured to allow the sender to contain a memory mapped register which drives a request signal to the receiver. Furthermore in such examples allow the receiver to contain a further memory mapped register which drives and an acknowledgement signal to the sender. In such examples the sender can place data into the buffer, update the sender write pointer, then compare the read and write pointers so that where the sender determines that the amount of data in the buffer is more than the agreed transfer size the sender sets a request signal by writing to the memory mapped register.

The receiver sees the request signal asserted and reads the agreed amount of data from the shared memory buffer. Once the receiver has read the data the receiver uses the receiver memory mapped register to invert the acknowledged signal. The sender then detects the edge of the acknowledged signal and updates the sender read pointer to take account of the data read from the shared memory buffer. Then based on the current fill level of the shared memory buffer the sender can choose to clear or assert the request signal.

These examples of flow control allow flow control to be maintained because the receiver will not attempt to read data from the buffer unless the request is asserted. Also the sender will not write data into the buffer if the write pointer passes the read pointer as the sequence of edges on the acknowledge signal ensure that the sender's copy of the read pointer is kept up to date.

In such examples only two wires between the sender and receiver, a request write wire and an acknowledge wire are required. However the request and acknowledge signals require very fast propagation between the sender and receiver. Where propagation is slow then the receiver can poll the request signal before the previous acknowledgement edge has propagated through to the de-assertion of the request resulting in a single request being serviced twice by the sender. This can for example generate memory buffer underflow.

SUMMARY

At least one embodiment provides a shared memory communication system between two separately clocked processors throughout the shared memory area to be used as a circular buffer while minimizing the number of connecting signals and being tolerant of high propagation latency on these signals.

According to one aspect there is provided a processor module comprising: a processor configured to share data with at least one further processor module processor; and a memory mapped peripheral configured to communicate with at least one further processor memory mapped peripheral to control the sharing of the data, wherein the memory mapped peripheral comprises a sender part comprising: a data request generator configured to output a data request indicator to the further processor module dependent on a data request register write signal from the processor; and an acknowledgement waiting signal generator configured to output an acknowledgement waiting signal to the processor dependent on a data acknowledgement signal from the further processor module, wherein the data request generator data request indicator is further dependent on the data acknowledgement signal and the acknowledgement waiting signal generator acknowledgement waiting signal is further dependent on the acknowledgement waiting register write signal.

The data request generator may comprise a first flip-flop configured to receive as a set input the data request register write signal, as a dominant clear input the acknowledgement waiting signal and to output a first provisional data request signal.

The data request generator may further comprise an AND logic combiner configured to receive as a first input the first provisional data request signal, as a second input an inverted acknowledgement waiting signal and to output a second provisional data request signal.

The data request generator may further comprise an XOR logic combiner configured to receive as a first input the second provisional data request signal and as a second input dependent on the data acknowledgement signal and to output a third provisional data request signal.

The data request generator may further comprise a second flip flop configured to output a synchronized third provisional data request signal as the data request indicator.

The acknowledgement waiting signal generator may comprise a first flip-flop configured to receive as a dominant set input an edge detected acknowledgement signal, as a clear input the acknowledgement waiting register write signal from the processor and to output the acknowledgement waiting signal to the processor.

The acknowledgement waiting signal generator may further comprise an edge detector configured to detect an edge change of the data acknowledgement signal from the further processor module.

The acknowledgement waiting signal generator may further comprise a data acknowledgement synchronizer configured to synchronize the data acknowledgement signal from the further processor module into a clock domain of the processor module.

The processor may be configured to share data with the at least one further processor module processor via a memory.

According to another aspect there is provided a processor module comprising: a processor configured to share data with at least one further processor module processor; and a memory mapped peripheral configured to communicate with at least one further processor memory mapped peripheral to control the sharing of the data, wherein the memory mapped peripheral comprises a receiver part comprising: a data acknowledgement generator configured to output a data acknowledgement signal to the further processor module dependent on a data acknowledgement register write signal from the processor; and a data request waiting signal generator configured to output a data request waiting signal to the processor dependent on a data request signal from the further processor module, and the data acknowledgement signal.

The data acknowledgement generator may comprise a toggle flip flop configured to receive as a input the data acknowledgement register write signal from the processor and to output the data acknowledgement signal to the further processor module.

The data request waiting signal generator may comprise an XOR logic combiner configured to receive as a first input the toggle flip-flop output, as a second input the data request signal from the further processor module and to output the data request waiting signal to the processor.

The data request waiting signal generator may further comprise a data request synchronizer configured to synchronize the data request signal from the further processor module into a clock domain of the processor module.

The processor may be configured to share data with the at least one farther processor module processor via a memory.

According to another aspect there is provided a processor module comprising: means for sharing data with at least one further processor module processor; and means for communicating with at least one further processor to control the sharing of the data, wherein the means for communicating with at least one further processor memory mapped processor comprises means for controlling sending data to the processor module comprising: means for outputting a data request indicator to the further processor module dependent on a data request register write signal from the processor; and means for outputting an acknowledgement waiting signal to the processor dependent on a data acknowledgement signal from the further processor module, wherein the means for outputting a data request indicator is further dependent on the data acknowledgement signal and the means for outputting an acknowledgement waiting signal is further dependent on the data acknowledgement waiting register write signal.

The means for outputting a data request indicator may comprise a first flip-flop configured to receive as a set input the data request register write signal, as a dominant clear input the acknowledgement waiting signal and to output a first provisional data request signal.

The means for outputting a data request indicator may further comprise an AND logic combiner configured to receive as a first input the first provisional data request signal, as a second input an inverted acknowledgement waiting signal and to output a second provisional data request signal.

The means for outputting a data request indicator may further comprise an XOR logic combiner configured to receive as a first input the second provisional data request signal and as a second input dependent on the data acknowledgement signal and to output a third provisional data request signal.

The means for outputting a data request indicator may further comprise a second flip flop configured to output a synchronized third provisional data request signal as the data request indicator.

The means for outputting an acknowledgement waiting signal may comprise a first flip-flop configured to receive as a dominant set input an edge detected acknowledgement signal, as a clear input the data acknowledgement waiting register write signal from the processor and to output the acknowledgement waiting signal to the processor.

The means for outputting an acknowledgement waiting signal may further comprise an edge detector configured to detect an edge change of the data acknowledgement signal from the further processor module.

The means for outputting an acknowledgement waiting signal may further comprise means for synchronizing the data acknowledgement signal from the further processor module into a clock domain of the processor module.

The processor may be configured to share data with the at least one further processor module processor via a memory.

According to another aspect there is provided a processor module comprising: means for sharing data with at least one further processor module processor; and means for communicating with at least one further processor to control the sharing of the data, wherein the means for communicating with at least one further processor memory mapped processor comprises means for controlling receiving data comprising: means for outputting a data acknowledgement signal to the further processor module dependent on a data acknowledgement register write signal from the processor; and means for outputting a data request waiting signal to the processor dependent on a data request signal from the further processor module and the data acknowledgement signal.

The means for outputting a data acknowledgement signal may comprise a toggle flip flop configured to receive as an input the data acknowledgement register write signal from the processor and to output the data acknowledgement signal to the further processor module.

The means for outputting a data request waiting signal may comprise an XOR logic combiner configured to receive as a first input the toggle flip-flop output, as a second input the data request signal from the further processor module and to output the data request waiting signal to the processor.

The means for outputting a data request waiting signal may further comprise means for synchronizing the data request signal from the further processor module into a clock domain of the processor module.

The processor may be configured to share data with the at least one further processor module processor via a memory.

According to another aspect there is provided a method comprising: sharing data between a processor module and at least one further processor module processor; and communicating with at least one further processor to control the sharing of the data, wherein communicating with at least one further processor comprising controlling sending data to the processor comprising: outputting a data request indicator to the further processor module dependent on a data request register write signal from the processor; and outputting an acknowledgement waiting signal to the processor dependent on a data acknowledgement signal from the further processor module, wherein outputting a data request indicator is further dependent on the data acknowledgement signal and outputting an acknowledgement waiting signal is further dependent on the acknowledgement waiting register write signal.

Outputting a data request indicator may comprise configuring a first flip-flop to receive as a set input the data request register write signal, as a dominant clear input the acknowledgement waiting signal and to output a first provisional data request signal.

Outputting a data request indicator may further comprise configuring an AND logic combiner to receive as a first input the first provisional data request signal, as a second input an inverted acknowledgement waiting signal and to output a second provisional data request signal.

Outputting a data request indicator may further comprise configuring an XOR logic combiner to receive as a first input the second provisional data request signal and as a second input dependent on the data acknowledgement signal and to output a third provisional data request signal.

Outputting a data request indicator may further comprise configuring a second flip flop to output a synchronized third provisional data request signal as the data request indicator.

Outputting an acknowledgement waiting signal may comprise configuring a flip-flop to receive as a dominant set input an edge detected acknowledgement signal, as a clear input the data acknowledgement waiting register write signal from the processor and to output the ack Outputting an acknowledgement waiting signal may further comprise configuring an edge detector configured to detect an edge change of the data acknowledgement signal from the further processor module.

Outputting an acknowledgement waiting signal may further comprise synchronizing the data acknowledgement signal from the further processor module into a clock domain of the processor module.

Sharing data between a processor module and at least one further processor module processor may comprise sharing data sharing data via a memory.

According to another aspect there is provided a method comprising: sharing data between a processor module and at least one further processor module processor; and communicating with at least one further processor to control the sharing of the data, wherein communicating with at least one further processor memory mapped processor comprises controlling receiving data comprising: outputting a data acknowledgement signal to the further processor module dependent on a data acknowledgement register write signal from the processor; and outputting a data request waiting signal to the processor dependent on a data request signal from the further processor module and the data acknowledgement signal. Outputting a data acknowledgement signal may comprise configuring a toggle flip flop to receive as an input the data acknowledgement register write signal from the processor and to output the data acknowledgement signal to the further processor module.

Outputting a data request waiting signal may comprise configuring an XOR logic combiner to receive as a first input the toggle flip-flop output, as a second input the data request signal from the further processor module and to output the data request waiting signal to the processor.

Outputting a data request waiting signal may further comprise synchronizing the data request signal from the further processor module into a clock domain of the processor module.

Sharing data between a processor module and at least one further processor module processor may comprise sharing data sharing data via a memory.

A processor-readable medium may be encoded with instructions that, when executed by a processor, perform a method as described herein.

Apparatus comprising at least one processor and at least one memory including computer code for one or more programs, the at least one memory and the computer code configured to with the at least one processor may cause the apparatus to at least perform a method as described herein.

BRIEF DESCRIPTION OF THE DRAWINGS

For better understanding of the present application, reference will now be made by way of example to the accompanying drawings in which.

DETAILED DESCRIPTION

The following describes in further detail suitable apparatus and possible mechanisms for the provision of shared memory controlling.

Figure 1:
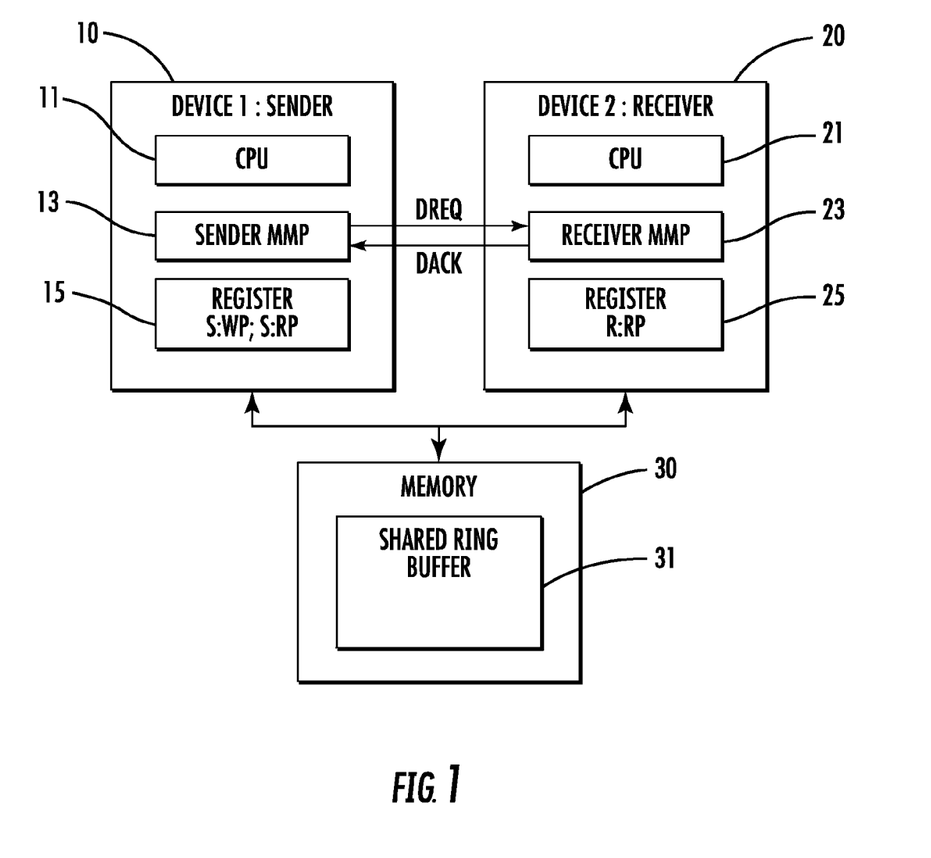
FIG. 1 shows schematically a shared memory system suitable for employing some embodiments of the application.

With respect to FIG. 1 an example system, device or apparatus is shown within which embodiments can be implemented. The system is shown comprising a first device 10 (Device 1), the sender, which is configured in the following examples as the device sending the data to the memory. The system is further shown comprising a second device 20 (Device 2), the receiver, which is configured in the following examples as the device receiving or reading data from the shared memory. The system is shown further comprising a shared memory 30 comprising a shared ring buffer portion 31 configured to be accessible for both the first device and the second device.

It would be understood that the first device 10 and the second device 20 can be any suitable electronic processing unit, such as processing cores fabricated on the same or different silicon structures, or packaged with the same or different integrated circuit packages. In some embodiments the first device 10, the second device 20 and the shared memory 30 are fabricated on the same silicon structure or packaged within the same integrated circuit package. In some embodiments the first device 20 is synchronized by a first clock domain signal and the second device 20 is synchronized by a second clock domain signal. In some embodiments the first clock domain signal and the second clock domain signal are the same signal, however the following examples are described where the first clock domain signal and to the second clock domain signals are different, for example having a phase or frequency difference. Furthermore although the following examples show the first device and the second device as sender and receiver respectively it would be understood that in some embodiments each device can be configured to send and receive. Furthermore in some embodiments the system can comprise more than two device configured to communicate to each other. In such embodiments each device communication pairing can comprise a sender and receiver pair as shown in the examples described herein.

The sender device 10 can in some embodiments comprise a central processing unit (CPU) 11 configured to generate data and enable the sending of data to the memory 30 shared ring buffer 31. The CPU 11 can be configured to be any suitable processor.

The sender device 10 can further comprise a sender memory mapped peripheral (sender MMP) 13. The sender memory mapped peripheral can be configured to assist in the control of data flow between the sender and the receiver devices. In some embodiments the sender MMP 13 can be configured to receive data request (DREQ) register write information from the CPU 11, and output a data request (DREQ) to the receiver indicating that the sender requests transferring data to the receiver (in other words that there is data placed in the shared memory for retrieval). The sender MMP 13 can further in some embodiments be configured to receive from a receiver MMP a data acknowledge (DACK) signal indicating that the request has been acknowledged by the receiver device, and to output to the sender CPU 11 a data acknowledgement waiting register signal. In some embodiments the sender MMP further can be configured to receive the data acknowledge (DACK) register write signal.

The sender device 10 can further in some embodiments comprise a register 15 suitable for storing values to be used by the CPU. The sender register 15 in some embodiments comprises a sender write pointer S:WP, and a sender read pointer S:RP. The sender write pointer S:WP and sender read pointer S:RP define write and read addresses within the share ring buffer 31 detailing the current address of the shared memory for the sender device to write to (the write pointer) and read from (the reader pointer RP). The pointers can in some embodiments be absolute or relative pointers.

The receiver device 20 can in some embodiments comprise a central processing unit (CPU) 21. The central processing unit 21 can in some embodiments be a CPU similar to that of the sender CPU 11, however in other embodiments the receiver CPU 21 can be different from the sender CPU 11. The receiver CPU 21 can be configured to be suitable for reading from the shared memory.

In some embodiments the receiver device 20 comprises a memory mapped peripheral (receiver MMP) 23. The receiver MMP can be configured to receive a data acknowledge (DACK) register write signal from the receiver CPU 21, and output an acknowledge signal (DACK) to the sender. Furthermore the receiver MMP 23 can be configured to receive the data request (DREQ) signal from the sender device and further be configured to output a request waiting signal (DREQ waiting) to the receiver CPU 21.

The receiver device 20 can further comprise in some embodiments a register 25 comprising the receiver read pointer (R:RP). As described herein the receiver read pointer (R:RP) can be configured to contain an address value for the shared memory 30 detailing from which location is the next location to read from.

Figure 2:
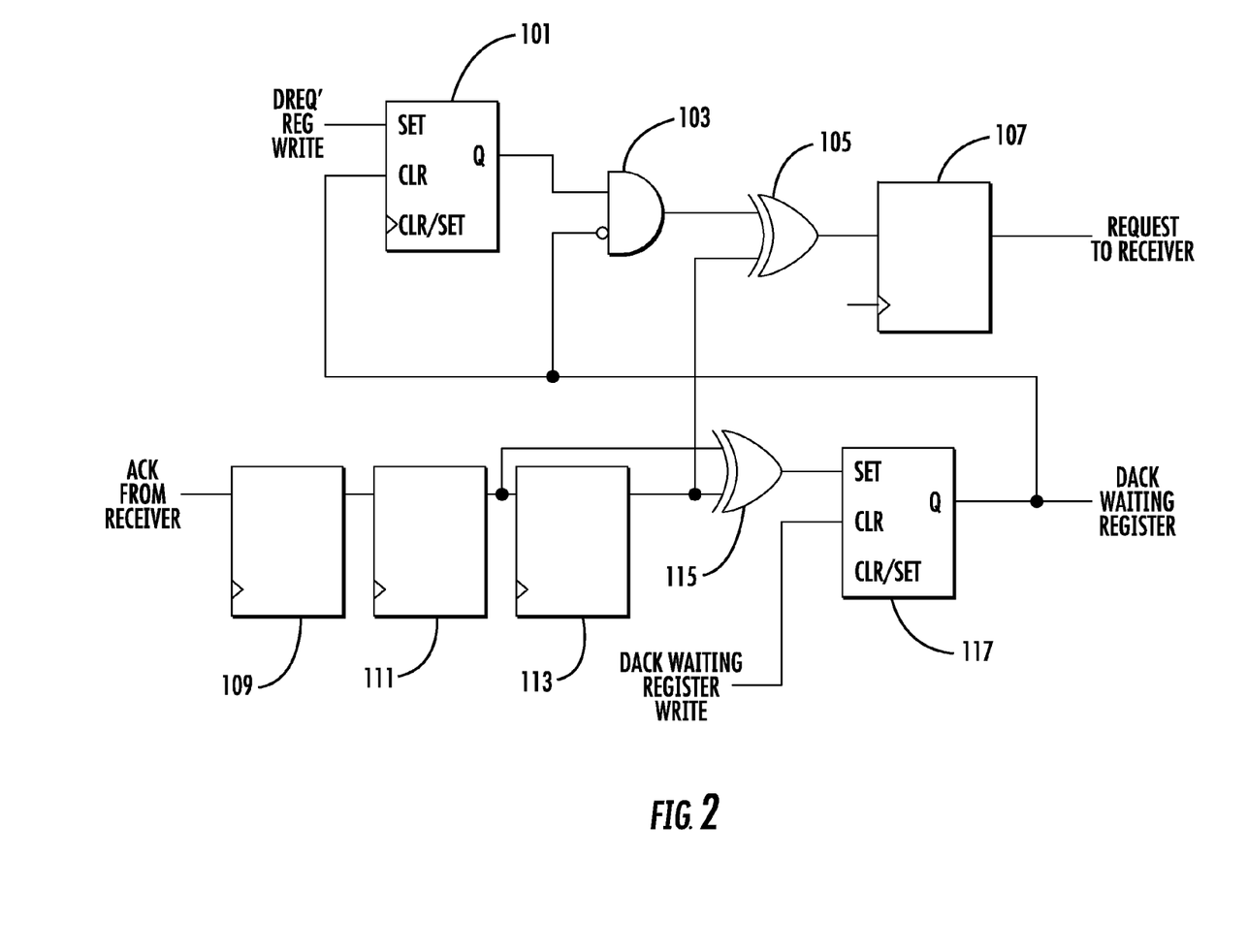
FIG. 2 shows schematically a sender MMP in further detail according to some embodiments of the application.

With respect to FIG. 2 an example of the sender memory mapped peripheral (sender MMP) 13 is shown in further detail. The sender MMP 13 in some embodiments comprises a first flip-flop (flip-flop A) 101. The first flip-flop 101 is configured with a clear (CLR) data input, a set (SET) data input, a data output (Q) and a synchronization clock input (>). In the following examples the clear input is given priority over the set input.

The first flip-flop 101 receives as the set input the data request (DREQ) register write signal. Furthermore the first flip-flop 101 is configured to receive the data acknowledge (DACK) waiting register signal as a clear input. The first flip-flop 101 can be configured to output the data output (Q) to a first AND gate 103.

The sender MMP 13 can in some embodiments further comprise an AND gate 103. The AND gate 103 is configured to receive as a first input the data output of the first flip-flop 101, and a second input which is an inverted data acknowledgement (DACK) waiting register signal. The output of the AND gate 103 is passed to a first XOR gate 105.

In some embodiments the sender MMP 13 comprises a first XOR gate 105. The first XOR gate 105 is configured to receive as a first input the output of the AND gate 103 and further configured to receive as a second input the output of a fifth flip-flop 113 (flip-flop E). The first XOR gate 105 is further configured to output the XOR'ed logic combination to a second flip-flop 107.

The sender memory mapped peripheral 13 in some embodiments further comprises a second flip-flop 107 (flip-flop B) configured to receive as a data input the first XOR gate 105 output. The second flip-flop 107 is further configured to output a synchronized version of the input which is the data request (DREQ) signal passed to the receiver device 20.

In some embodiments the sender MMP 13 further comprises a third flip-flop 109 (flip-flop C). The third flip-flop 109 is configured to receive as a data input the data acknowledgement signal (DACK) from the receiver. The third flip flop 109 is configured to output a synchronized or clocked version of the input signal to a fourth flip-flop 111.

In some embodiments the sender MMP 13 comprises a fourth flip flop (flip-flop D) 111. The fourth flip flop 111 is configured to receive as a data input the output of the third flip flop 109 and further configured to output a synchronized or clocked version of the input signal to the fifth flip-flop 113, and a second XOR gate 115.

In some embodiments the sender MMP 13 comprises a fifth flip-flop 113 (flip-flop E) configured to receive as a data input the output of the fourth flip-flop 111, and configured to output a synchronized or clocked version of the input signal to the first XOR gate 105 and the second XOR gate 115.

In some embodiments the sender MMP 13 further comprises a second. XOR gate 115 configured to receive the output of the fourth flip-flop 111 as a first input and the output of the fifth flip-flop 113 as a second input. The second XOR gate 115 is configured to output the XOR'ed combination to a sixth flip-flop 117.

In some embodiments the sender MMP 13 further comprises a sixth flip-flop 117 (flip-flop F). The sixth flip-flop 117 is configured to receive as a set input (SET) the output of the second XOR gate 115, and configured to receive as a clear input (CLR) a data acknowledgement waiting register write signal (DACK waiting register write). The sixth flip-flop 117 is configured with the set input given priority over the clear input. The output of the sixth flip-flop 117 (Q) is output as the data acknowledgement (DACK) waiting register signal which is output to the CPU, the first flip-flop 101, and as the inverted input of the AND gate 103.

Figure 3:
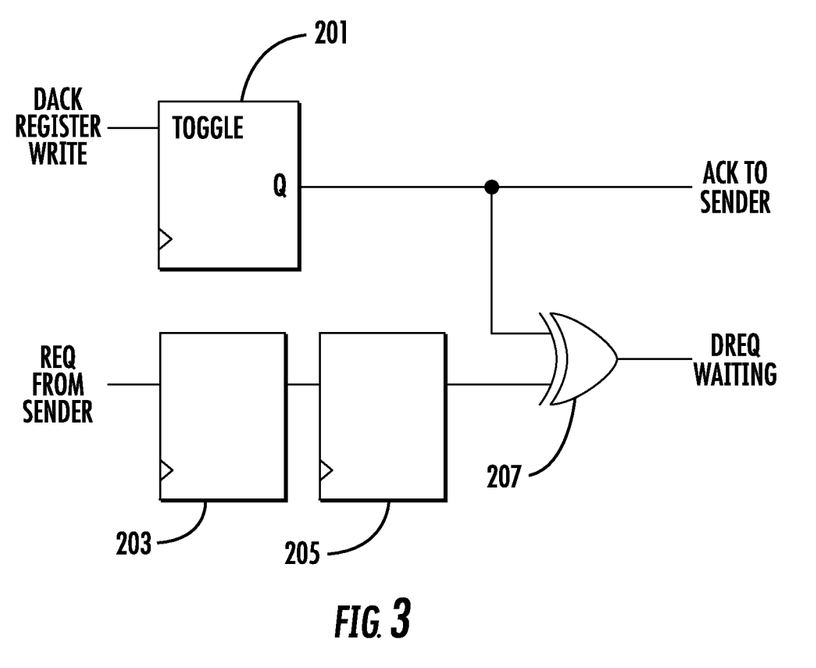
FIG. 3 shows schematically a receiver MMP in further detail according to some embodiments of the application.

With respect to FIG. 3 an example receiver memory map peripheral (receiver MMP) 23 is shown in further detail. The receiver MMP 23 can in some embodiments comprise a first or toggle flip-flop 201 (flip-flop G). The toggle flip-flop 201 can be configured to receive as its toggle input the data acknowledgement register write signal (DACK register write) received from the receiver CPU 21. The output of the toggle flip-flop 201 can be output as the acknowledgement signal to the sender (DACK) and an input to a XOR gate 207.

In some embodiments the receiver MMU 23 can further comprise a second flip-flop 203 (flip-flop H), configured to receive the request (DREQ) signal from the sender 10 and output a clocked version to a third flip-flop 205.

The receiver MMU 23 can further comprise in some embodiments a third flip flop 205 (flip-flop I) configured to receive as a data input the output of the second flip-flop 203 and configured to output a clocked version to the XOR gate 207.

The receiver MMU 23 can in some embodiments further comprise a XOR gate 207 configured to receive as a first input the output of the toggle flip-flop 201 and as a second input the output of the third flip-flop 205. The XOR gate 207 can be configured to output the data request waiting (DREQ waiting) signal to the receiver CPU 21.

In the examples herein the sender and receiver MMU flip-flops the clock and reset connections have been omitted for clarity. Furthermore in examples described herein all of the flip-flops are reset to 0 at power up. In such embodiments as described above the flip-flop inputs (set, clear and toggle) are considered to be synchronous inputs.

In these examples all the sender flip-flops are furthermore clocked using the same 'sender' clock source and all the receiver flip-flops are clocked from the same 'receiver' clock source. In some embodiments the sender and receiver clock sources can be the same clock source or be substantially the same. However it would be understood that in some embodiments as described herein the clock sources may differ and have phase or frequency differences.

Figure 4:
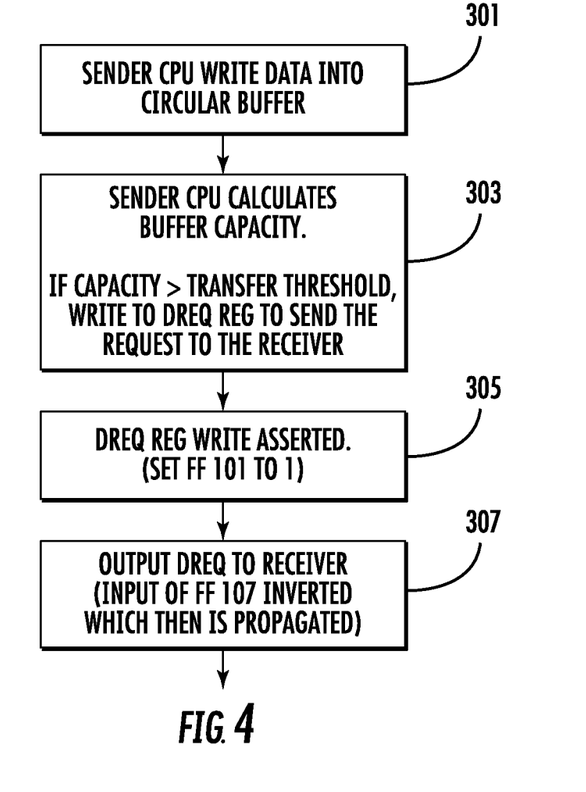
FIG. 4 shows a flow diagram of the shared memory controller with respect to the sender request operations according to some embodiments of the application.
Figure 5:
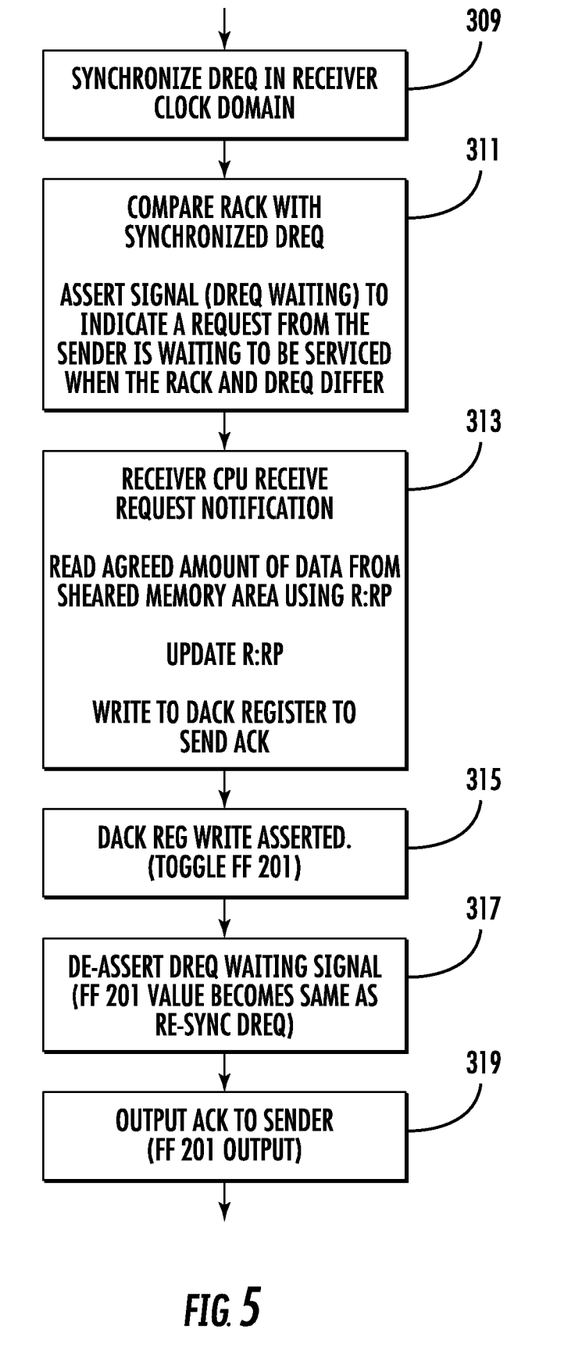
FIG. 5 shows a flow diagram of the shared memory controller with respect to the receiver request and acknowledgement operations according to some embodiments of the application.
Figure 6:
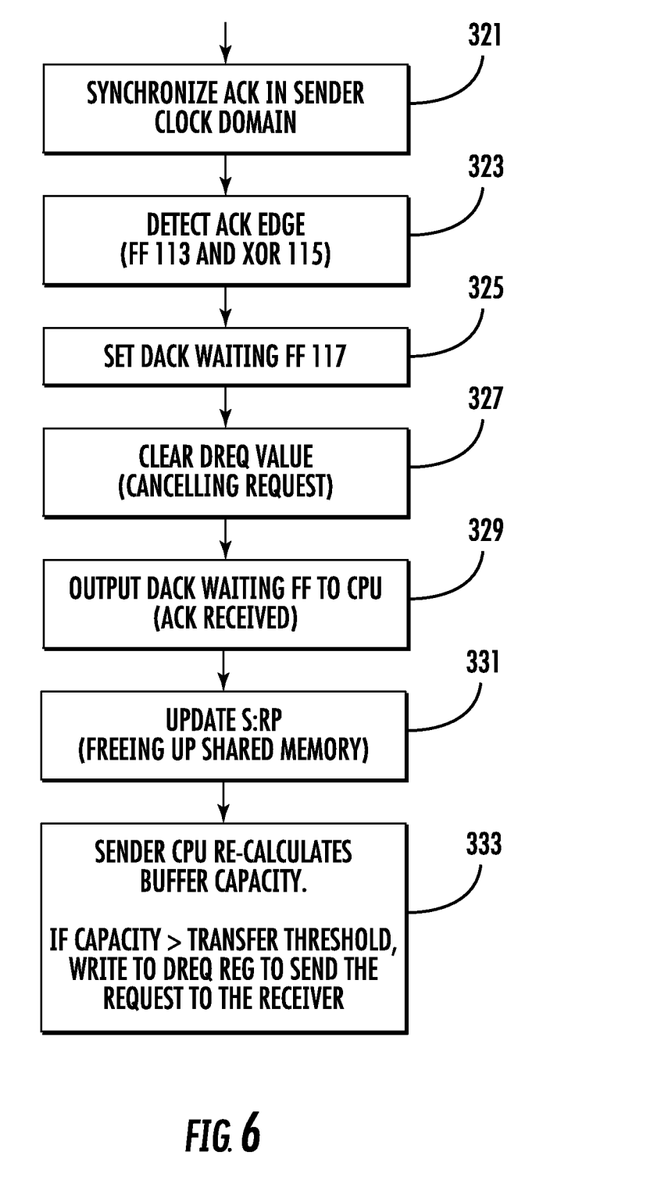
FIG. 6 shows a flow diagram of the shared memory controller with respect to the sender acknowledgement operations according to some embodiments of the application.

With respect to FIGS. 4, 5, and 6 the operation of the communication between the devices with respect to embodiments of the application is described in further detail. With respect to FIG. 4 the operation of communication between the devices up to the passing of the sender data request is described.

The sender CPU 11 can be configured in some embodiments to write data into the circular buffer (or shared ring buffer 31). The sender CPU 11 can for example write data into the circular buffer using the sender write pointer S:WP. The sender CPU 11 furthermore can be configured to ensure that the data does not overflow the buffer by checking that the write pointer S:WP does not pass the read point S:RP for the determined data transfer size.

The operation of writing data onto the circular buffer is shown in FIG. 4 by step 301.

Once the sender CPU 11 has written data into the circular buffer the sender CPU 11 can be configured to determine or calculate how much data is remaining in the buffer. In other words the sender CPU 11 determines the buffer capacity. Where the capacity or available amount of data is greater than the transfer threshold than the CPU 11 can be configured to write to the data request register to send the request to the receiver 20. The transfer threshold can be any suitable value such as zero in other words the sender CPU can be configured to send a request whenever the buffer is not empty.

The operation of determining buffer capacity and when checking the capacity being greater than the transfer threshold to write the data request register to write to the data request register to send the request is shown in FIG. 4 by step 303.

The data request register write signal being asserted sets the sender MMP first flip-flop 101 to a value of one as the data request register write signal is equal to 1.

The data request register write signal being asserted setting the flip-flop 101 to 1 operation is shown in FIG. 4 by step 305.

The signal then propagates via the AND gate 103 and the XOR gate such that the input of the second flip-flop 107 is inverted and is then propagated at the next clock signal to output a request to the receiver in the form of the DREQ signal being output.

The operation of outputting the signal DREQ to the receiver is shown in FIG. 4 by step 307.

With respect to FIG. 5 the operation of communication between the devices from the outputting of the DREQ signal to the outputting of the DACK signal is shown in further detail according to some embodiments of the application.

The receiver MMP 23 can be configured to receive the data request (DREQ) signal from the sender 10 where the second flip-flop 203 and the third flip-flop 205 synchronize the request into the receiver clock domain. It would be understood that the number of flip-flops required to synchronize the request can be greater than or fewer than two flip-flops depending on the clock frequencies used for the sender (CPU) and the receiver (CPU). In some embodiments the receiver MMP 23 can be configured to comprise no resynchronization flip-flops, in other words the DREQ signal passes directly to the XOR gate 207, where the sender and receiver are within the same clock domain or where the process technology is sufficient to allow auto-synchronisation.

The operation of synchronizing the data request received from the sender into the receiver clock domain is shown in FIG. 5 by step 309.

The receiver MMP 23 then can be configured to compare the receiver acknowledgement (DACK) output with the resynchronized request from the sender. This comparison can be performed, as shown in FIG. 3, by the XOR gate 207. When the two signals, the receiver acknowledgment (DACK) output, and the resynchronized request from the sender are different the receiver MMP 23 and in particular the XOR gate 207 can be configured to assert the DREQ waiting signal to indicate that a request from the sender is waiting to be serviced. This DREQ waiting signal can in some embodiments be transmitted to the CPU 21. However the data request waiting signal could be used to interrupt the receiver CPU 21, made available in a register for reading, or made available as a flag for branching.

The comparison of the receiver acknowledgement signal with the synchronized data request signal to generate a DREQ waiting signal is shown in FIG. 5 by step 311.

The receiver CPU 21 can be configured to receive the request notification (DREQ waiting) and react by reading the agreed amount of data from the shared memory area using the receiver read pointer (R:RP). The receiver CPU 21 can then be configured to update the receiver read pointer (R:RP) to take account of the data that has been read and write to the data acknowledgement register to send an acknowledgement to the sender.

The operation of receiving the request waiting notification, reading the agreed amount of data, updating the read pointer, and writing to the data acknowledgement register to send an acknowledgement is shown in FIG. 5 by step 313.

The writing to the DACK register to send an acknowledgement to the sender causes the data acknowledge register write signal to be asserted, which in some embodiments is received by the toggle flip-flop 201 causing the value of the flip-flop to toggle.

The operation of asserting the data in a register write signal and toggling the flip-flop 201 is shown in FIG. 5 by step 315.

The toggling of the flip-flop 201 causes the output value to be the same as the resynchronised request from the sender de-asserting the data request waiting signal.

The de-asserting of the data request waiting signal is shown in FIG. 5 by step 317.

Furthermore the toggle flip-flop 201 is configured to send the acknowledge signal (DACK) to the sender.

The outputting of the flip-flop 201 output acknowledge signal to the sender is shown in FIG. 5 by step 319.

With respect to FIG. 6 the operation of communication between the devices from the output of the acknowledge signal to the completion of the communications cycle is shown in further detail. The sender MMP 13 can be configured to receive the acknowledge signal (DACK) from the receiver. The acknowledge signal can in some embodiments be resynchronised into the sender clock domain by the third flip-flop 109 and the fourth flip-flops 111. It would be appreciated that in some embodiments the number of resynchronization flip-flops can be more than or fewer than two flip-flops depending on the clock frequencies of the sender and receiver. Furthermore as described herein the sender can be configured with no resynchronization flip-flops where in embodiments of the application the same clock domain is used for both the sender and receiver or where the process technology allows it.

The operation of synchronizing the acknowledge signal into the sender clock domain is shown in FIG. 6 by step 321.

Furthermore the resynchronized acknowledge signal is passed through the fifth flip-flop 113 and the input and output of the fifth flip-flop 113 can then be compared by the second XOR gate 115. The second XOR gate 115 thus can be configured to detect a rising or falling edge of the acknowledge signal being received.

The detection or determination of an acknowledge rising or falling edge is shown in FIG. 6 by step 323.

The rising or falling edge detection output then sets the sixth flip-flop 117.

The operation of setting the flip-flop 117 is shown in FIG. 6 by step 325.

The setting of the flip-flop 117 causes an assertion of the output value, in other words the output of the sixth flip-flop is set to 1. This output value causes the output of the first flip-flop 101 to be cleared, cancelling the effect of the original data request register write (DREQ Reg Write) signal at the first flip-flop 101 which is propagated to the DREQ signal output to the receiver.

The clearing of the DREQ value and in other words cancelling the request operation is shown in FIG. 6 by step 327.

The data acknowledge waiting register signal is also output from the sixth flip-flop 117. In other words in some embodiments the sender MMP 13 asserts the value of the sixth flip-flop to the sender CPU 11 to indicate that an acknowledgement has been received. This acknowledgement can be used according to some embodiments as an interrupt, register value or flag in a manner similar to the data request signal received at the receiver.

The operation of outputting the data acknowledge waiting flip-flop signal to the sender CPU 11 is shown in FIG. 6 by step 329.

The sender CPU 11 can in some embodiments react to the acknowledge waiting signal by updating the sender read pointer S:RP. In other words the sender CPU 11 frees up the shared memory space occupied by the data the receiver has read.

The operation of updating the S:RP, is shown in FIG. 6 by step 331.

The sender CPU 11 can furthermore in some embodiments recalculate the buffer fill level. Where the amount of data in the buffer is greater than the transfer threshold the sender CPU 11 can be configured to write to the data request (DREQ) register to reassert the date request.

The operation of re-calculating the buffer capacity and writing to the DREQ register where the capacity is greater than the transfer threshold is shown in FIG. 6 by step 333.

This operation enables further cycles of generating DREQ and DACK signals.

The advantages of these embodiments of the application are that there is a minimisation of the number of connections required (only one signal in each direction). Furthermore in some embodiments the operation is tolerant of any amount of latency in the request or acknowledgement signals.

In these embodiments the sender can place as many transfers worth of data into the buffer without the receiver being required to remove any of the data provided that the buffer is large enough. Furthermore in some embodiments multiple requests do not cancel each other out.

The senders CPU according to some embodiments can be further be allowed to be recalculate and reassert the request safely at any time without causing the receiver to receive a spurious request. For example where the sender attempts to reassert the request whilst an acknowledgement is waiting the request is ignored because the waiting acknowledgement overrides the request.

It would be understood that while the read and write pointer management can be performed by software running on the CPUs the embodiments of the application can be extended to include automatic pointer management hardware.

Furthermore although the above description describes where the control of a shared memory is performed the operations and designs in communicating predetermined commands from one CPU to another can also be implemented using embodiments of the application.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof Embodiments may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system comprising:
    first and second circuits; and
    a shared memory coupled between said first and second circuits;
    said first circuit configured to share data with at least said second circuit, the second circuit comprising a second processor, and a second memory mapper coupled thereto;
    said first circuit comprising a first processor, and a first memory mapper coupled to the first processor and configured to communicate directly with at least the second memory mapper to control sharing of the data via said shared memory, said first memory mapper comprising
        first and second flip-flops configured to output a data request indicator directly to the second circuit dependent on a data request register write signal from the first processor, and
        a third flip-flop configured to output an acknowledgement waiting signal to the first processor dependent on a data acknowledgement signal directly received from the second circuit, the data request indicator being dependent on the data acknowledgement signal, the acknowledgement waiting signal being dependent on an acknowledgement waiting register write signal from the second processor.

2. The system as claimed in claim 1, wherein the first flip-flop is configured to receive as a set input the data request register write signal from the first processor and as a clear input the acknowledgement waiting signal, and to output a first provisional data request signal.

3. The system as claimed in claim 2, wherein the first memory mapper comprises an AND logic combiner configured to receive as a first input the first provisional data request signal from the first flip-flop and as a second input an inversion of the acknowledgement waiting signal, and to output a second provisional data request signal.

4. The system as claimed in claim 3, wherein the first memory mapper comprises an XOR logic combiner configured to receive as a first input the second provisional data request signal from the AND logic combiner and as a second input dependent on the data acknowledgement signal from the second circuit, and to output a third provisional data request signal.

5. The system as claimed in claim 4, wherein the second flip flop is configured to output a synchronized third provisional data request signal as the data request indicator.

6. The system as claimed in claim 1, wherein the third flip-flop is configured to receive as a set input an edge detection acknowledgement signal and as a clear input the acknowledgement waiting register write signal from the second processor, and to output the acknowledgement waiting signal to the first processor.

7. The system as claimed in claim 6, wherein the first memory mapper comprises an edge detector configured to detect an edge change of the data acknowledgement signal from the second circuit.

8. The system as claimed in claim 7, wherein the first memory mapper comprises a data acknowledgement synchronizer configured to synchronize the data acknowledgement signal from the second circuit into a clock domain of the circuit.

9. A method for operating a system comprising first and second circuits, and a shared memory coupled between the first and second circuits, the method comprising:
   operating the first circuit to share data with at least the second circuit, the second circuit comprising a second processor, and a second memory mapper coupled thereto, the first circuit comprising a first processor, and a first memory mapper coupled to the first processor and to communicate directly with at least the second memory mapper to control sharing of the data via the shared memory, the first memory mapper comprising
      first and second flip-flops configured to output a data request indicator directly to the second circuit dependent on a data request register write signal from the first processor, and
      a third flip-flop configured to output an acknowledgement waiting signal to the first processor dependent on a data acknowledgement signal directly received from the second circuit, the data request indicator being dependent on the data acknowledgement signal, the acknowledgement waiting signal being dependent on an acknowledgement waiting register write signal from the second processor.

10. The method as claimed in claim 9, further comprising operating the first flip-flop to receive as a set input the data request register write signal from the first processor and as a clear input the acknowledgement waiting signal, and to output a first provisional data request signal.

11. The method as claimed in claim 10, further comprising operating an AND logic combiner to receive as a first input the first provisional data request signal from the first flip-flop and as a second input an inversion of the acknowledgement waiting signal, and to output a second provisional data request signal.

12. The method as claimed in claim 11, further comprising operating an XOR logic combiner to receive as a first input the second provisional data request signal from the AND logic combiner and as a second input dependent on the data acknowledgement signal from the second circuit, and to output a third provisional data request signal.

13. The method as claimed in claim 12, wherein the second flip flop is configured to output a synchronized third provisional data request signal as the data request indicator.

14. The method as claimed in claim 9, further comprising operating the third flip-flop to receive as a set input an edge detection acknowledgement signal and as a clear input the acknowledgement waiting register write signal from the second processor, and to output the acknowledgement waiting signal to the first processor.

15. The method as claimed in claim 14, further comprising operating an edge detector to detect an edge change of the data acknowledgement signal from the second circuit.

16. The method as claimed in claim 15, further comprising operating a data acknowledgement synchronizer to synchronize the data acknowledgement signal from the second circuit into a clock domain of the circuit.

17. A system comprising:
   first and second circuits; and
   a shared memory coupled between said first and second circuits;
   said first circuit configured to share data with at least said second circuit, the second circuit comprising a second processor, and a second memory mapper circuit coupled thereto;
   said first circuit comprising a first processor, and a first memory mapper circuit coupled to the first processor and configured to communicate directly with at least the second memory mapper circuit to control sharing of the data via said shared memory, said first memory mapper circuit comprising
      first and second flip-flops configured to output a data request indicator directly to the second circuit dependent on a data request register write signal from the first processor, and
      a third flip-flop configured to output an acknowledgement waiting signal to the first processor dependent on a data acknowledgement signal directly received from the second circuit, the data request indicator being dependent on the data acknowledgement signal, the acknowledgement waiting signal being dependent on an acknowledgement waiting register write signal from the second processor.

18. The system as claimed in claim 17, wherein the first flip-flop is configured to receive as a set input the data request register write signal from the first processor and as a clear input the acknowledgement waiting signal, and to output a first provisional data request signal.

19. The system as claimed in claim 18, wherein the first memory mapper circuit comprises a first logic combiner configured to receive as a first input the first provisional data request signal from the first flip-flop and as a second input an inversion of the acknowledgement waiting signal, and to output a second provisional data request signal.

20. The system as claimed in claim 19, wherein the first memory mapper circuit comprises a second logic combiner configured to receive as a first input the second provisional data request signal from the first logic combiner and as a second input dependent on the data acknowledgement signal from the second circuit, and to output a third provisional data request signal.

* * * * *